(12) United States Patent
Burkhard et al.

(10) Patent No.: US 6,374,682 B1
(45) Date of Patent: Apr. 23, 2002

(54) FORCE-MEASURING APPARATUS, PARTICULARLY A WEIGHING CELL I

(75) Inventors: Hans-Rudolf Burkhard, Wila; Luzi Hess, Zurich, both of (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 09/469,386

(22) Filed: Dec. 22, 1999

(30) Foreign Application Priority Data

Dec. 23, 1998 (DE) ......................................... 198 59 992

(51) Int. Cl.⁷ .............................. G01L 1/00; G01M 1/00
(52) U.S. Cl. ..................................... 73/862.381; 73/472
(58) Field of Search ...................... 73/862.381, 862.472, 73/862.69, 862

(56) References Cited

U.S. PATENT DOCUMENTS

| | | | | |
|---|---|---|---|---|
| 4,088,015 A | * | 5/1978 | Wolfer ......................... | 73/141 |
| 4,480,707 A | * | 11/1984 | Hafner ......................... | 177/208 |
| 4,491,028 A | * | 1/1985 | Hatamura ................. | 73/862.62 |
| 4,625,566 A | * | 12/1986 | Gallo et al. ............... | 73/862.38 |
| 4,938,300 A | * | 7/1990 | Kunz ......................... | 177/164 |
| 5,245,872 A | * | 9/1993 | Cooper et al. ................. | 73/161 |
| 5,315,073 A | * | 5/1994 | Ast et al. ..................... | 177/212 |
| 5,340,951 A | * | 8/1994 | Hungerbuhler .............. | 177/229 |
| 5,641,948 A | * | 6/1997 | Burkhard et al. ............ | 177/229 |
| 5,719,357 A | * | 2/1998 | Eger et al. ................... | 177/184 |
| 5,866,854 A | * | 2/1999 | Emery et al. .................. | 177/50 |
| 6,194,672 B1 | * | 2/2001 | Burkhard et al. ............ | 177/210 |

FOREIGN PATENT DOCUMENTS

| | | |
|---|---|---|
| DE | 9206286 | 10/1992 |
| DE | 4204480 | 5/1998 |

* cited by examiner

Primary Examiner—Benjamin R. Fuller
Assistant Examiner—Lilybett Martir
(74) Attorney, Agent, or Firm—Friedrich Kueffner

(57) ABSTRACT

A force-measuring apparatus has a stationary part, a load receiver, and two parallel guides connected to the load receiver and attachment areas of the stationary part. The load receiver is restrained by the guides to move parallel to the stationary part. An adjuster device adjusts the attachment areas transverse to the guides. It has an arm extending parallel to the guides that can pivot about a pivotal axis on the stationary part. An adjusting member acts on an adjustment area of the arm. The attachment area is located on the arm between the adjustment area and the pivotal axis. The distance from the adjustment area to the attachment area is at least as long as the distance from the attachment area to the pivotal axis. When the adjustment area is adjusted by a given amount, the attachment area is displaced by an amount less than the given amount.

19 Claims, 3 Drawing Sheets

FORCE-MEASURING APPARATUS, PARTICULARLY A WEIGHING CELL I

BACKGROUND OF THE INVENTION

The present invention relates to a force-measuring apparatus, particularly a weighing cell, with a load receiver serving to receive the force that is to be measured. The load receiver is restrained to a mode of parallel motion in relation to a stationary part by two guides that extend in parallel planes and are rigid in all directions within the planes but movable in the direction transverse to the planes. Each of the guides is connected at one end to the load receiver and at the opposite end to the stationary part. The apparatus includes an adjuster device by which the position of at least one of the attachment areas where one of the guides is attached to the stationary part can be adjusted in the direction transverse to the planes of the guides. The adjuster device has an arm that extends approximately parallel to the planes of the guides and is rotatably connected to the stationary part so that the arm is rotatable about a pivotal axis that is approximately parallel to said planes and approximately perpendicular to the lengthwise direction of the arm. The arm includes the attachment area as well as an adjustment area for an adjusting member that serves to tilt the arm about its pivotal axis.

Weighing cells of this kind have the purpose of generating a position-independent measuring signal for the weight of a load that is placed on a weighing pan or load platform attached to the load receiver, i.e., the signal for a given load has the same magnitude no matter where the load is placed on the weighing pan. The parallelism of the guides is critical for the position-independent property of the cell, which requires that the weighing pan or platform move in a strictly parallel mode in response to a load. Particularly with high-precision balances, it is therefore necessary to provide an adjuster device that allows the parallel alignment of the guides in relation to each other to be precisely adjusted.

A weighing cell with an adjuster device of this kind is proposed, e.g., in DE 86 15 750.7 U1. The weighing cell described there has one end of the guides connected to the stationary part through an additional parallel-guiding linkage. The upper portion of the additional parallel-guiding linkage carries the attachment area for attaching the guides. A bottom-end surface of the additional parallel-guiding linkage and an upward-facing fixed surface of the stationary part enclose between themselves an approximately wedge-shaped gap. Inserted in this gap is a bolt that extends parallel to the planes of the guides. An adjustment screw runs through the bolt, transverse to the longitudinal axis of the latter, and is held in a threaded hole of the stationary part. The adjustment screw serves to move the bolt in or out within the wedge-shaped gap where the bolt bears against the bottom-end surface of the additional parallel-guiding linkage on one side and against the upward-facing fixed surface on the other side. This arrangement allows the upper portion of the additional parallel-guiding linkage with the attachment area, and thus the attached ends of the guides, to be adjusted up or down in the direction transverse to the guides. This adjustment serves to align the guide that is attached to the upper portion of the additional parallel-guiding linkage to be exactly parallel to the other guide. However, this adjuster device is expensive to manufacture because, in addition to the parallel-guiding system for the load receiver, an additional parallel-guiding linkage is required that carries the attachment area for attaching one of the guides to the stationary part.

In a weighing cell of the kind named at the beginning and known from DE 87 08 485.6 U1, the attachment area that is adjustable with the adjuster device and serves for the attachment of one of the guides to the stationary part is formed on an arm that is connected to the stationary part through a pivotal flexure. In the weighing cell according to the aforementioned reference, the arm is formed by a separating slit that extends into the stationary part about parallel to the plane of the guides and opens to the rear of the weighing cell. Enclosed between the dead end of the slit and a top surface of the stationary part is a narrow bridging portion of material that forms the pivotal flexure. The adjustable attachment area is arranged on the topside of the rear portion of the arm, i.e., at the opposite end from the pivotal flexure. To adjust the position of the attachment area in the transverse direction in relation to the plane of the guides, the weighing cell of the aforementioned reference has an adjusting member in the form of a differential screw. One threaded section of the differential screw is engaged in a threaded hole through the rear portion of the arm, while the other threaded portion (of different pitch) is engaged in a threaded hole of the body of the stationary part. The rear portion of the arm can be precisely adjusted up or down by turning the differential screw.

However, the small angular movement of the arm that is produced by turning the differential screw of this weighing cell also causes a slight tilting of the threaded hole in the arm in relation to the threaded hole in the body of the stationary part. Thus, by turning the differential screw, transverse forces are introduced into the arm, which can lead to an undesirable distortion of the arm. To eliminate this problem, an insert is placed in the slit of the known weighing cell. The inserted part contacts the underside of the arm and the adjacent body surface of the stationary part along straight contact lines that are parallel to each other.

Although this adjuster device which comprises the pivotally connected arm, the differential screw and the insert, as just described, has significant technical advantages over the adjuster device with the additional parallel-guiding linkage, the manufacturing process of the adjuster device is still expensive because, in addition to cutting the internal threads to receive the sections of the differential screw in the arm and the body of the stationary part, it is also necessary to manufacture and install an insert with two exactly parallel contact lines.

SUMMARY OF THE INVENTION

In view of the aforementioned problems inherent in state-of-the-art devices, it is therefore the object of the present invention to provide a force-measuring apparatus that belongs to the kind described at the beginning but offers the advantage of simplified construction while assuring a high degree of measuring accuracy.

According to the invention, this goal is accomplished through a design advancement of the known force-measuring apparatus. The essential characteristic features of the inventive design are that in the lengthwise direction of the arm, the distance from the adjustment area for the adjusting member to the attachment area is at least exactly the same as the distance from the attachment area to the pivotal axis so that, when the adjustment area is moved up or down by a given amount, e.g., through the action of a suitable adjusting member, this causes the attachment area to move by a lesser amount.

The invention is based on the observation that the arm, which is pivotally connected to the stationary part so as to provide an adjustable attachment area, can also be used as a lever to effect a reduction of the amount of displacementtravel at the ratio of the respective distances of the adjustment area and the attachment area from the pivotal axis. The lever reduction allows the position of the attachment area to be precisely adjusted through the use of a standard adjustment screw with a single fine-pitched thread. The adjustment screw is engaged in a corresponding thread in the body of the stationary part and applies its adjusting force to the adjustment area of the arm or, alternatively, the adjustment screw is engaged in a corresponding thread in the adjustment area of the arm and pushes against the body of the stationary part. Because an adjustment screw of this kind is engaged only in one mating thread, the screw can be arranged so that, when an adjustment requires the arm to be tilted, there will be no appreciable transverse forces that could cause a distortion of the arm. Consequently, the inventive design advancement of a force-measuring apparatus allows a precise adjustment of the attachment area with a standard adjustment screw that is engaged in only one mating thread, and the additional insert of the prior art is no longer required. Thus, the weighing cell according to the invention can be made in a simple manufacturing process while assuring a high level of measuring accuracy.

In a design version that was found to be particularly practical because it allows the weighing cell to be assembled from an exceptionally small number of components, the arm that carries the attachment area is formed integrally as a portion of the stationary part and is connected to the latter through a pivotal flexure in the form of a narrow material connection.

To provide a particularly compact weighing cell, it is advantageous if the arm that comprises the attachment area has the form of a one-armed lever where, in the lengthwise direction of the arm, the attachment area is arranged at a location between the adjustment area and the pivotal axis. This allows the space between the stationary ends and the load-receiver ends of the guides to be used for the arm that comprises the attachment area, if the arm—as seen in a sectional plane perpendicular to its pivotal axis—extends from the pivotal axis in the direction towards the load-receiver ends of the guides. In this arrangement, the space between the pivotal axis or pivotal flexure and the attachment area can be used to accommodate the part of the guide that is to be connected to the attachment area, if the connecting flexure element is arranged so that, from its attachment to the guide, it extends forward in the direction towards the load-receiver end of the guide. With this configuration, the arm that comprises the attachment area can be accommodated almost completely within the spatial envelope that would in any case be required for the guides.

A particularly large reduction ratio of the displacement introduced by the adjusting member is achieved if the arm extends approximately over the entire length of the guides between their stationary ends and their load-receiver ends.

If the stationary part extends also approximately over the entire length of the guides, the arm with its pivotal connection to the stationary part can be realized by providing a slit in the stationary part. The slits may be open at the front surface of the stationary apart in the vicinity of the laod receiver. However, if the front surface of the stationary part near the load receiver also has a coupling area for a balance lever that transmits all or part of the weighing force from the load receiver to a measuring transducer, it has proven to the particularly practical if the arm extends between the coupling area of the balance lever and the pivotal axis of the arm, with the slit running out of a surface of the stationary part that runs parallel to the planes of the guides, e.g., the top surface of the stationary part.

To make the configuration of the inventive force-measuring apparatus as compact as possible, it has further proven to be very advantageous if the arm extends essentially in a plane that runs between and is parallel to the planes of the guides, because this configuration allows the space between the guides to be used for accommodating the arm.

The arm that comprises the attachment area can be given a particularly weight-saving configuration combined with exceptional torsional stiffness around the attachment area if a section of the arm that comprises the attachment area is thicker (in the direction transverse to the planes of the guides) than a section of the arm that comprises the adjustment area.

If the arm is designed exceptionally long in order to achieve a particularly large reduction ratio, it is possible to stabilize the arm against moving sideways and at the same time assure the desired adjustability, if the inventive force-measuring apparatus includes a stabilizer element that is connected at one end to the arm and at the other end to the body of the stationary part, so that it stiffens the arm against moving sideways in parallel with the planes of the guides while allowing movement perpendicular to the planes of the guides, preferably by being elastically flexible. A stabilizer element of this kind can be realized in a particularly simple manner through the formation of a connector portion similar to a leaf spring. The connector portion extends between the arm and the body of the stationary part with at least one bend in between. The purpose of the bend is to ensure the required flexibility perpendicular to the planes of the guides.

A connector portion of this kind provides a particularly effective stabilization of the arm against moving sideways while maintaining the elastic flexibility in the perpendicular direction, if the connector portion—in a sectional plane that is perpendicular to the pivotal axis of the arm—has essentially the shape of an S-curve. Staring at the arm, the connector has a first short segment perpendicular to the guides, bends into a longer segment parallel to the guides, and then bends into a second short segment that connects to the body of the stationary part.

In addition to stiffening the arm against sideways movement, the stabilizer element in the form of a connector portion also helps to prevent torsional deformation of the arm, if the width of the connector portion in the direction parallel to the pivotal axis is significantly greater than its thickness. From a practical point of view, it is best if the connector portion has about the same width as the arm.

To achieve the most compact configuration possible for the inventive force-measuring apparatus, it has proven to be particularly advantageous if, in relation to the lengthwise direction of the arm, the stabilizer element is arranged essentially at a location between the adjustment area and the attachment area. This allows the remaining free space between the guides to be utilized, if the stabilizer element is arranged essentially between the guides, as seen in a sectional plane that is perpendicular to the pivotal axis.

From the point of view of optimizing the construction, it has proven to be particularly advantageous if the stabilizer element is formed in a monolithic unit together with the arm and/or the body of the stationary part, because this arrangement helps to reduce the number of parts required to build the inventive weighing cell.

If one of the guides is connected to the stationary part at two attachment areas that are located at a distance from each other, it is possible to obtain a particularly precise alignment of this guide in relation to the other guide, if the adjuster device allows the positions of the two attachment areas to be adjusted independently of each other in the direction perpendicular to the planes of the guides.

From the point of view of optimizing the construction, it has proven to be particularly advantageous if the adjusting member is provided in the form of an adjustment screw that runs perpendicular to the planes of the guides, passes through a hole in the arm and is engaged in a matching threaded hole of the body of the stationary part. The head of the adjustment screw can push against an outer surface of the arm that faces away from the stationary part, if the adjuster device comprises a pre-tensioning element that urges the arm against the head of the adjustment screw. The attachment area can be a raised pad in the top surface of the arm with a threaded hole for fastening the guide flexure.

In the following, the invention is explained on the basis of the drawing, which is also being explicitly referred to with regard to all details essential to the invention that are not closely portrayed in the description.

DETAILED DESCRIPTION OF THE INVENTION

Figure 2:
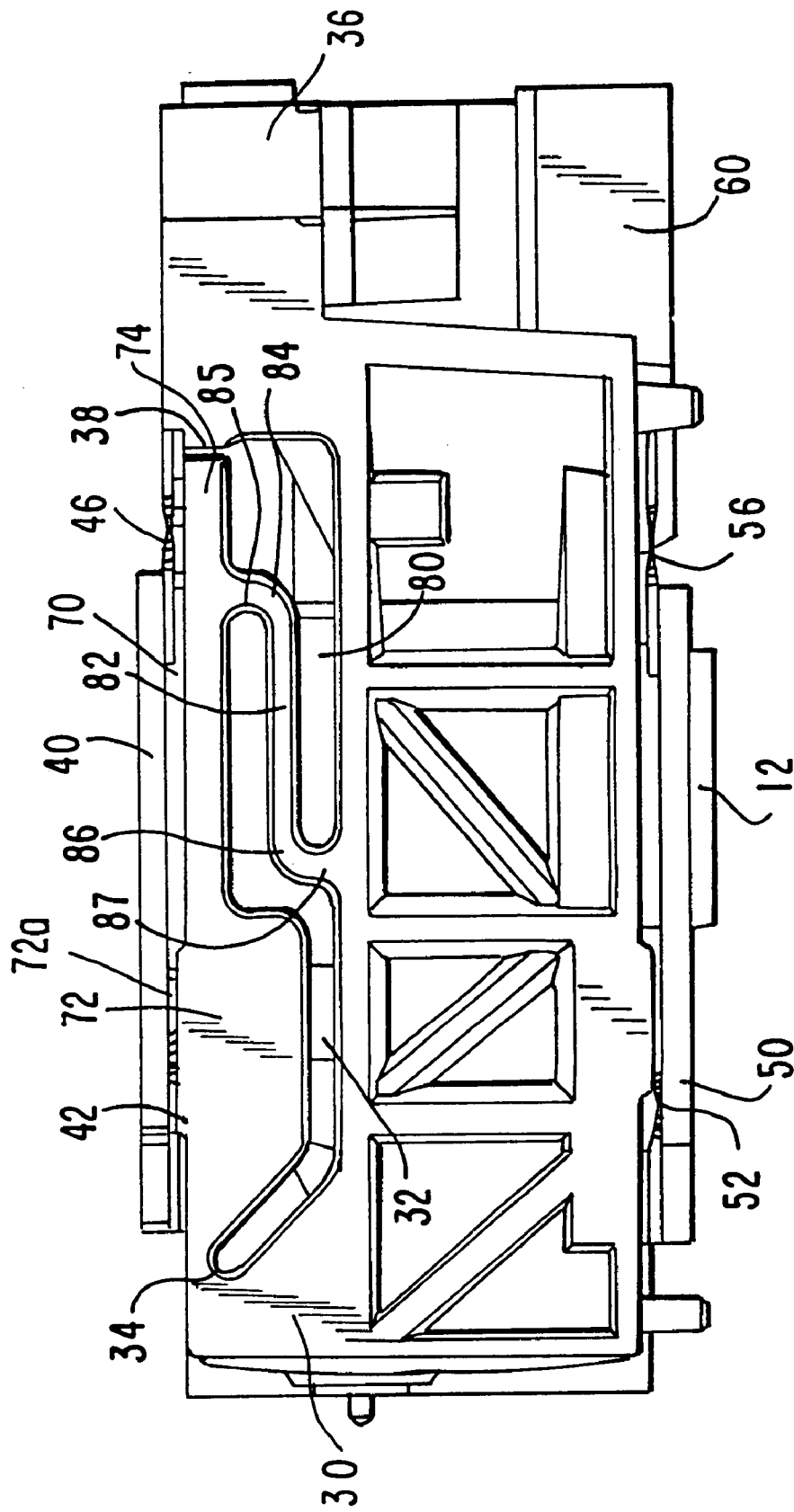
FIG. 2 represents a side view of the weighing cell of FIG. 1 as seen in the direction indicated by the arrow A of FIG. 1.

The weighing cell shown in the drawing essentially consists of a stationary part referenced in its entirety as 10, an upper guide 40, a lower guide 50 (see FIGS. 2 and 3) extending in a parallel plane relative to the plane of the upper guide 40, and a load receiver 60 that is restrained to a mode of parallel motion by the guides 40 and 50.

The stationary part comprises two lateral parts 20 and 30 that are approximately perpendicular to the planes of the guides 40 and 50 and are joined together by rigid transverse connectors. The lateral parts 20 and 30 together with the rigid, plate-shaped guides 40 and 50 enclose an essentially square interior compartment of the weighing cell in which the load receiver 60 and a lever 62 are accommodated. The force acting on the load receiver 60 is transmitted by the lever 62 to a measuring transducer. The lever 62 can be coupled to the stationary part 10 at the coupling areas 26 and 36 of the lateral parts 20 and 30, and it can likewise be coupled to the load receiver 60 through a flexible coupling connecting the attachment area 62a (FIG. 3) at the frontal surface of the lever with a frontal surface 61a of the load receiver 60.

The lateral parts 20 and 30 contain slits 22 and 32, respectively, starting at the narrow material connections 24, 34 and extending towards the coupling areas 26 and 36. The slits 22 and 32 run out into material-free spaces 28 and 38 at the top of the lateral parts 20 and 30 where the material-free spaces 28 and 38, extending approximately perpendicular to the planes of the guides 40 and 50, delimit the coupling areas 26 and 36. The slits 22 and 32 delimit in each of the lateral parts 20 and 30 an arm 70. The arms 70 begin at the narrow material connections 24, 34, run approximately parallel to the guides 40, 50 in the direction towards the coupling areas 26, 36, and end at the material free spaces 28, 38. Each of these arms 70 has an attachment area 72 that serves to fasten the upper guide 40 to the stationary part 10 and an adjustment area in the form of a hole 74 for an adjustment screw (not shown) that is perpendicular to the planes of the guides 40, 50. The attachment areas 72 are located between the narrow material connections 24, 34 and the hole 74 and arranged so that the distance from the hole 74 to the attachment area 72 is greater than the distance from the attachment area 72 to the narrow material connection 24, 34 (see FIG. 2).

The top surface 72a of the attachment area 72 is slightly raised in comparison to the rest 72b of the upper surface of the arm 70. Attached to the raised surface areas 72a are the fastening lugs 43, 45 of the pivotal flexures 42, 44 that extend from the back end of the upper guide 40 in the direction towards the load receiver 60. Through the pivotal flexures 42, 44, the upper guide 40 is coupled to the attachment areas 72 and thus also to the lateral parts 20 and 30 of the stationary part 10. At its opposite end, the upper guide 40 is coupled to the load receiver 60 through the pivotal flexures 46 and 48. The lower guide 50, formed as a rigid plate like the upper guide 40, is coupled in like manner to the lateral parts 20 and 30 and to the load receiver 60 through flexures that are the analogous counterparts of the flexures 42, 44 and 46, 48, respectively. Shown in FIGS. 2 and 3 at respectively opposite locations from the flexures 42 and 46 are the flexures 52 and 56 by which the lower guide is attached at one end to the lateral part 30 and at the other end to the load receiver 60.

The arms 70 can be tilted about an axis defined by the pivotal flexures that are formed by the narrow material connections 24 and 34 by turning one of the adjustment screws that are inserted in the holes 74. By tilting an arm 70, the attachment surface 72a of the attachment area 72 (and thus also the attached fastening lug 43 or 45 of the flexure 42 or 44, respectively, of the upper guide 40) is raised or lowered approximately perpendicular to the planes of the guides. This adjustment process allows the upper guide 40 to be aligned precisely parallel to the lower guide 50. Each of the arms functions as a one-armed lever in that the displacement effected by the adjustment screw at the hole 74 is leveraged down by a factor of more than two at the respective attachment area 72. Thus, each of the attachment areas 72 can be precisely adjusted up or down with simple adjustment screws running through the respective holes 74.

In this arrangement, an undesirable distortion of the arms 70 at the attachment areas 72 is prevented on the one hand by a greater material thickness of the attachment areas 72 and on the other hand by stabilizer elements 80 contained in the slits 22 and 32. Each of the stabilizer elements 80 is formed in a monolithic unit, together with the arm and the main body of the respective lateral part 20 or 30, as a connecting portion between the underside of the arm and an upward facing surface of the lateral part. The connecting portions that form the stabilizer elements 80 have an approximately S-shaped cross-section, viewed in the direction of the pivotal axis that is defined by the narrow material connections 24 and 34. From the respective arm 70, the connecting portion 80 starts with a first short segment 85 perpendicular to the guides 40, 50, continues around a first bend 84 into a longer segment 82 parallel to the guides, then turns around a second bend 86 into a second short segment 87 that connects to the main body of the respective lateral part 20 or 30. In the direction of the pivotal axis defined by the narrow material connections 24, 34, the connecting portions 80 have the same width as the arms 70, while their other cross-sectional dimension is significantly smaller. In relation to the lengthwise direction of the arms 70, the connecting portions 80 are arranged between the holes 74 and the attachment areas 72. Seen in a plane that is perpendicular to the aforementioned pivotal axis, the connecting portions 80 are located between the upper guide 40 and the lower guide 50.

The configuration of the connecting portions 80 as described above and illustrated in the drawing provides on the one hand an elastically flexible support for the arms 70 in the vertical direction relative to the planes of the guides 40 and 50, and on the other hand it increases the rigidity of the arms 70 in the horizontal direction. In addition, the connecting portions 80 help to prevent torsional deformation of the arms 70 in relation to their longitudinal axes.

Figure 3:
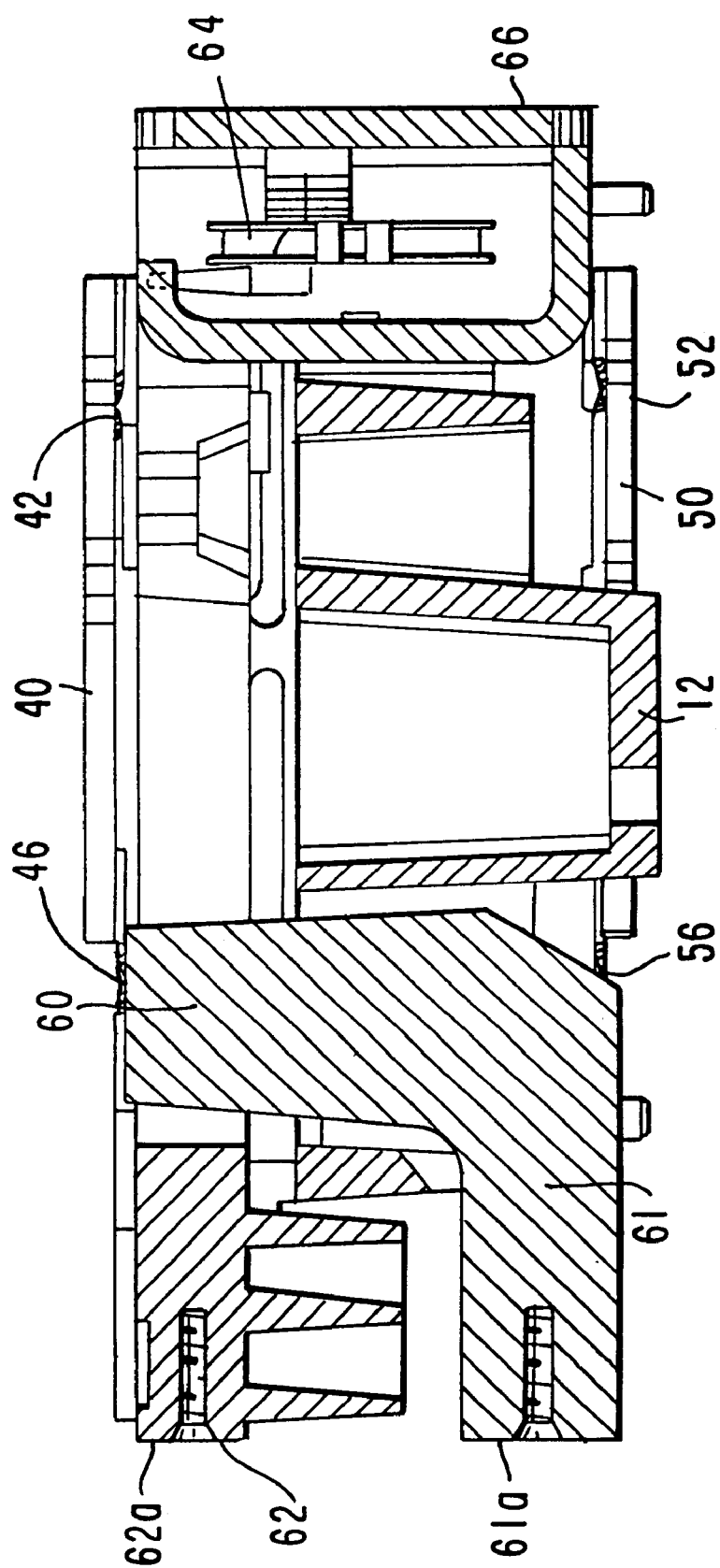
FIG. 3 represents a cross-sectional view of the weighing cell of FIG. 1.

As shown with particular clarity in FIG. 3, the load receiver 60 has in its lower portion an outward-directed extremity 61 that is approximately parallel to the planes of the guides 40, 50. At its outer end, the extremity 61 is delimited by a frontal surface 61a, perpendicular to the planes of the guides 40, 50 and in co-planar alignment with a frontal surface 62a of the lever 62. The latter is coupled through fulcrum flexures (not shown) to the coupling areas 26 and 36 of the lateral parts 20 and 30, respectively. By means of a flexible coupling between the frontal surfaces 61a and 62a, the force that acts on the load receiver 60 can be transmitted to the lever 62. Thus, a force applied to the load receiver 60 will cause the lever 62 to tilt about its fulcrum axis that is defined by the aforementioned fulcrum flexures and runs approximately parallel to the planes of the guides 40, 50.

As illustrated most clearly in FIG. 3, the lever 62 extends over the entire length of the weighing cell and carries at its opposite end from the frontal surface 62a a magnet coil 64 that is immersed in the magnetic field of a permanent magnet assembly 66. The permanent magnet assembly 66 is immovably attached to the stationary part 10. The coil 64 and the permanent magnet assembly 66 together form an electromagnetic force-compensation system with the function of counteracting and canceling the displacement of the lever 62 that occurs as a result of a force being applied to the load receiver 60. The current that needs to be supplied to the compensation coil 64 in order to balance the lever represents a measure for the force that is acting on the load receiver 60. Thus, the current forms an electrical measuring signal that corresponds to the magnitude of the force to be measured and can be subjected to a process of electronic signal conversion.

Figure 1:
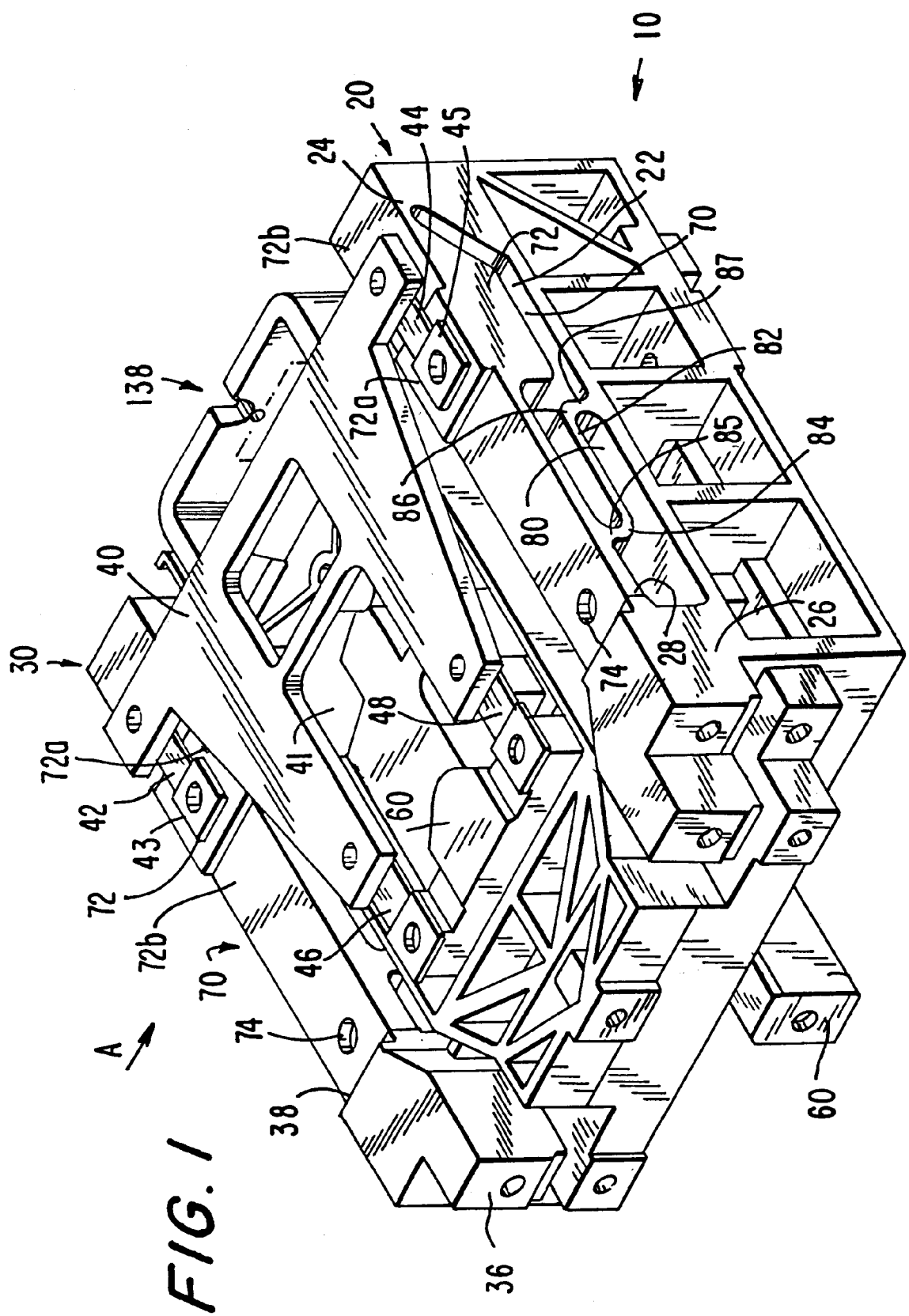
FIG. 1 represents a perspective view of a weighing cell according to the invention.

As can further be seen in FIG. 3, the stationary part 10 also comprises a central support 12 in addition to the lateral parts 20 and 30. The central support 12 traverses the lower guide 50 through a window that corresponds to the window 41 in the upper guide 40 (see FIG. 1). The central support 12 serves to mount the illustrated weighing cell in the chassis frame of a balance.

The invention is not limited to the embodiment that has been presented here on the basis of the drawing. The scope of the invention is also intended to cover an embodiment where the slits 22 and 32, starting from the narrow material connections 24 and 34, extend all the way to the frontal perimeter surface of the lateral parts 20 and 30. Furthermore, each of the guides 40 and 50 could be coupled to the load receiver 60 by only one pivotal flexure. Likewise, it is conceivable to couple the guides 40 and 50 to the stationary part through only one pivotal flexure. As a further possibility, in the place of a single lever for transmitting the force from the load receiver to the force transducer, one could also use a lever system comprised of two or more levers.

What is claimed is:

1. A force-measuring apparatus, particularly a weighing cell, comprising:
    a stationary part;
    a load receiver serving to receive a force to be measured;
    two guides each having a first end and a second end opposite the first end, wherein the first ends are connected to the load receiver and the second ends are connected to attachment areas of the stationary part, respectively;
    the load receiver being restrained to a mode of parallel motion in relation to the stationary part by the two guides that extend in parallel planes and are rigid in all directions within the planes but movable in a direction transverse to the planes;
    an adjuster device configured to positionally adjust at least one of the attachment areas in a direction transverse to the planes of the guides, the adjuster device having an arm extending substantially parallel to the planes of the guides and pivotally connected to the stationary part so as to be rotatable about a pivotal axis;
    the pivotal axis being substantially parallel to the planes of the guides and substantially perpendicular to the arm;
    an adjusting member configured to tilt the arm about the pivotal axis by acting on an adjustment area of the arm; and
    the attachment area being located on the arm between the adjustment area and the pivotal axis and wherein the distance along the arm from the adjustment area to the attachment area is at least as long as the distance from the attachment area to the pivotal axis and wherein, when the adjustment area is positionally adjusted by a given amount by tilting the arm with the adjustment member, the attachment area is displaced by an amount less than the given amount.

2. The force-measuring apparatus according to claim 1, wherein the arm is connected to the stationary part through a pivotal flexure.

3. The force-measuring apparatus according to claim 2, wherein the arm is formed integrally as a portion of the stationary part and the pivotal flexure is formed as a narrow material connection between the arm and a body portion of the stationary part.

4. A force-measuring apparatus according to claim 1, wherein the arm extends lengthwise from the pivotal axis in the direction to the first end of the guides.

5. The force-measuring apparatus according to claim 4, wherein the stationary part extends substantially over an entire length from the second end of the guides to the first end of the guide and wherein the arm is delimited by a slit against a body portion of the stationary part.

6. The force-measuring apparatus according to claim 5, wherein a front surface of the stationary part near the load receiver comprises a coupling area for a balance lever that transmits all or part of the weighing force from the load receiver to a measuring transducer and wherein further the arm extends between the coupling area and the pivotal axis.

7. The force-measuring apparatus according to claim 1, wherein the arm extends substantially in a plane positioned between the planes of the guides and parallel to the planes of the guides.

8. The force-measuring apparatus according to claim 1, wherein a section of the arm that comprises the attachment area is thicker in the direction transverse to the planes of the guides than a section of the arm that comprises the adjustment area.

9. The force-measuring apparatus according to claim 1, comprising a stabilizer element having a first end and a second end, wherein the first end of the stabilizer element is connected to the arm and the second end of the stabilizer element is connected to a body portion of the stationary part, wherein the stabilizer element is configured to stiffen the arm against moving sideways in parallel with the planes of the guides while allowing flexible movement perpendicular to the planes of the guides.

10. The force-measuring apparatus according to claim 9, wherein the stabilizer element comprises a connector portion that extends from the arm to a body portion of the stationary part and has at least one bend in between.

11. The force-measuring apparatus according to claim 10, wherein the connector portion appears essentially S-shaped when viewed in a direction parallel to the pivotal axis of the arm.

12. The force-measuring apparatus according to claim 11, wherein the connector portion has a first one and a second one of the at least one bend, and wherein, starting at the arm, the connector portion is successively comprised of a short segment perpendicular to the guides, the first bend adjoining the short segment, a long segment parallel to the guides adjoining the first bend, the second bend adjoining the long segment, and a second short segment perpendicular to the guides adjoining the second bend, wherein the second short segment connects to a body portion of the stationary part.

13. The force-measuring apparatus according to claim 10, wherein the connector portion has a width in the direction parallel to the pivotal axis and a thickness in the direction perpendicular to the pivotal axis, wherein the width is greater than the thickness.

14. The force-measuring apparatus according to claim 9, wherein the first end of the stabilizer element is connected to the arm between the adjustment area and the attachment area.

15. The force-measuring apparatus according to claim 9, wherein the second end of the stabilizer element is arranged between the guides, as seen in a viewing direction parallel to the pivotal axis.

16. The force-measuring apparatus according to claim 9, wherein the stabilizer element is formed in a monolithic unit together with at least one of the arm and the body of the stationary part.

17. The force-measuring apparatus according to claim 1, wherein at least one of the guides has two of the attachment areas located at a distance from each other and wherein the adjuster device is configured to adjust the two attachment areas independently of each other in a direction perpendicular to the planes of the guides.

18. The force-measuring apparatus according to claim 1, wherein the adjustment area comprises a through hole and the stationary part has a threaded hole, wherein the adjusting member is an adjustment screw penetrating the through hole and engaging the threaded hole of the stationary part.

19. The force-measuring apparatus according to claim 18, wherein the adjustment screw has a head that pushes against an outer surface of the arm facing away from the stationary part and the adjuster device comprises a pre-tensioning element configured to urge the arm against the head of the adjustment screw.

* * * * *